US012566157B2

(12) United States Patent
Shen et al.

(10) Patent No.: US 12,566,157 B2
(45) Date of Patent: Mar. 3, 2026

(54) ACOUSTIC EMISSION INTERNAL TESTING METHOD AND DEVICE FOR DETECTING CORROSION OF LARGE LIQUID-CARRYING STORAGE TANK BOTTOM PLATE

(71) Applicant: China Special Equipment Inspection and Research Institute, Beijing (CN)

(72) Inventors: Gongtian Shen, Beijing (CN); Yongna Shen, Beijing (CN); Junjiao Zhang, Beijing (CN); Pengcheng Gan, Beijing (CN); Bin Hu, Beijing (CN); Baoxuan Wang, Beijing (CN)

(73) Assignee: CHINA SPECIAL EQUIPMENT INSPECTION AND RESEARCH INSTITUTE, Beijing (CN)

( * ) Notice: Subject to any disclaimer, the term of this patent is extended or adjusted under 35 U.S.C. 154(b) by 397 days.

(21) Appl. No.: 18/202,385

(22) Filed: May 26, 2023

(65) Prior Publication Data

US 2024/0219352 A1 Jul. 4, 2024

(30) Foreign Application Priority Data

Dec. 29, 2022 (CN) .......................... 202211700399.5

(51) Int. Cl.
*G01N 29/22* (2006.01)
*G01N 29/04* (2006.01)
(Continued)

(52) U.S. Cl.
CPC ......... *G01N 29/225* (2013.01); *G01N 29/043* (2013.01); *G01N 29/14* (2013.01); *G01N 29/265* (2013.01); *G01N 29/4427* (2013.01);

*G01N 2291/015* (2013.01); *G01N 2291/023* (2013.01); *G01N 2291/0289* (2013.01); *G01N 2291/103* (2013.01)

(58) Field of Classification Search
CPC .. G01N 29/043; G01N 29/14; G01N 29/4427; G01N 29/225; G01N 29/265
See application file for complete search history.

(56) References Cited

U.S. PATENT DOCUMENTS

| 2011/0161037 A1* | 6/2011 | Sutherland | ............ | G01M 3/243 |
| | | | | 702/165 |
| 2020/0172184 A1* | 6/2020 | Abdellatif | .............. | G05D 1/696 |
| 2022/0176736 A1* | 6/2022 | Abdellatif | ............ | G01N 29/265 |

* cited by examiner

*Primary Examiner* — Helen C Kwok
(74) *Attorney, Agent, or Firm* — Barclay Damon LLP

(57) ABSTRACT

An acoustic emission internal testing method and device for detecting corrosion of a large liquid-carrying storage tank bottom plate. An acoustic emission sensor is configured to collect an acoustic emission signal generated by an underwater acoustic transducer, and to calculate an attenuation coefficient of the acoustic emission signal when propagated by the underwater acoustic transducer through a medium, thereby determining a step distance of the storage tank robot. After the storage tank robot travels every step distance on a storage tank bottom plate, the acoustic emission sensor collects an acoustic emission signal generated by the storage tank bottom plate. Finally, the position where the storage tank bottom plate is corroded and the corrosion degree are determined according to intensity characteristic parameters and activity characteristic parameters of the acoustic emission signal collected after the storage tank robot travels every step distance.

8 Claims, 2 Drawing Sheets

Storage tank bottom plate testing robot

Telescopic rod

Sensor 1#    Sensor 2#    Sensor 3#

Storage tank bottom plate

Underwater acoustic transduce

(51) Int. Cl.
  *G01N 29/14*       (2006.01)
  *G01N 29/265*     (2006.01)
  *G01N 29/44*       (2006.01)

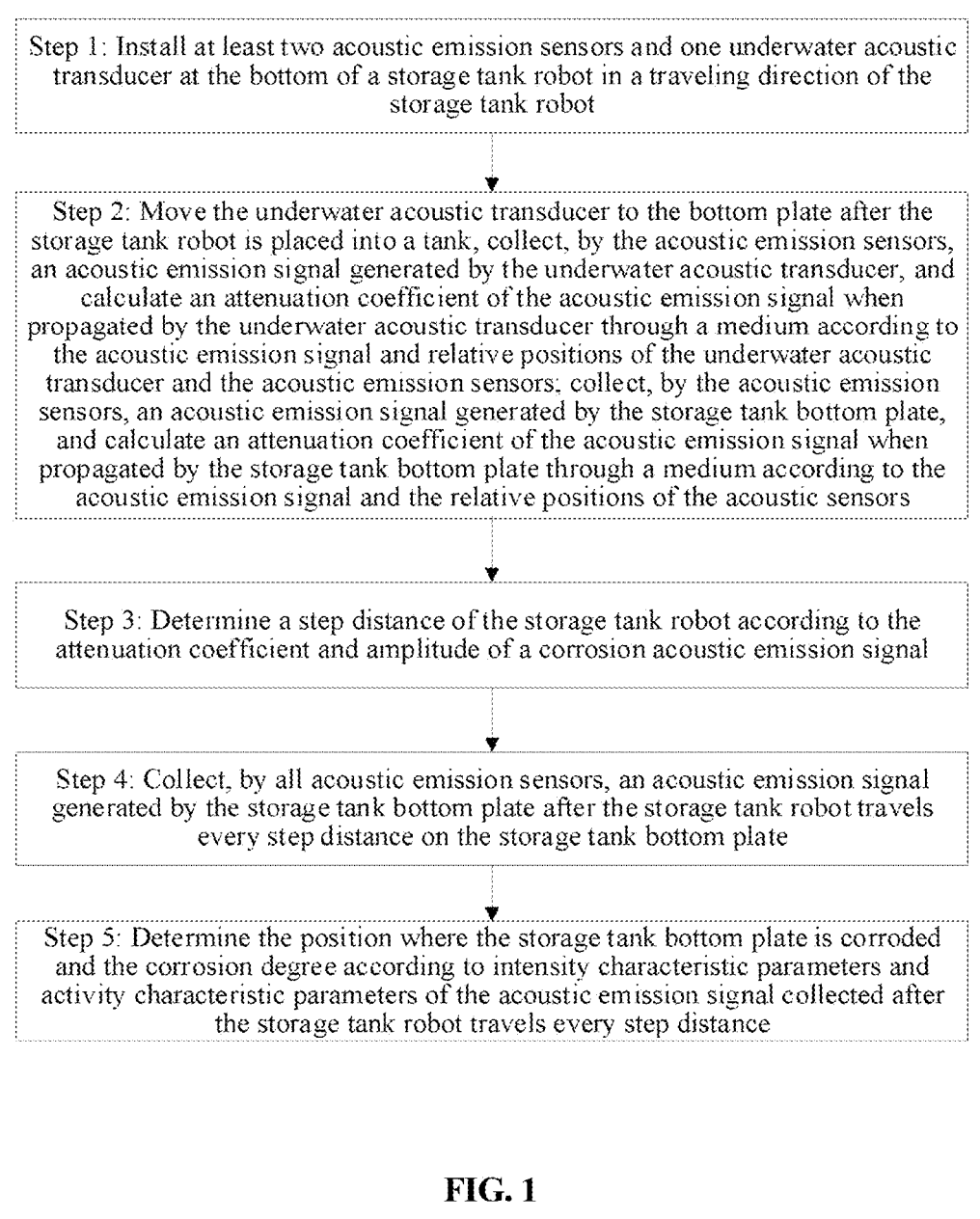

Step 1: Install at least two acoustic emission sensors and one underwater acoustic transducer at the bottom of a storage tank robot in a traveling direction of the storage tank robot Step 2: Move the underwater acoustic transducer to the bottom plate after the storage tank robot is placed into a tank, collect, by the acoustic emission sensors, an acoustic emission signal generated by the underwater acoustic transducer, and calculate an attenuation coefficient of the acoustic emission signal when propagated by the underwater acoustic transducer through a medium according to the acoustic emission signal and relative positions of the underwater acoustic transducer and the acoustic emission sensors; collect, by the acoustic emission sensors, an acoustic emission signal generated by the storage tank bottom plate, and calculate an attenuation coefficient of the acoustic emission signal when propagated by the storage tank bottom plate through a medium according to the acoustic emission signal and the relative positions of the acoustic sensors Step 3: Determine a step distance of the storage tank robot according to the attenuation coefficient and amplitude of a corrosion acoustic emission signal Step 4: Collect, by all acoustic emission sensors, an acoustic emission signal generated by the storage tank bottom plate after the storage tank robot travels every step distance on the storage tank bottom plate Step 5: Determine the position where the storage tank bottom plate is corroded and the corrosion degree according to intensity characteristic parameters and activity characteristic parameters of the acoustic emission signal collected after the storage tank robot travels every step distance

FIG. 1

ACOUSTIC EMISSION INTERNAL TESTING METHOD AND DEVICE FOR DETECTING CORROSION OF LARGE LIQUID-CARRYING STORAGE TANK BOTTOM PLATE

CROSS-REFERENCE TO RELATED APPLICATION

This patent application claims the benefit and priority of Chinese Patent Application No. 202211700399.5, filed with the China National Intellectual Property Administration on Dec. 29, 2022, the disclosure of which is incorporated by reference herein in its entirety as part of the present application.

TECHNICAL FIELD

The present disclosure relates to the field of testing of storage tank bottom plates, and in particular to an acoustic emission internal testing method and device for detecting corrosion as well as the corrosion degree of a large liquid-carrying storage tank bottom plate.

BACKGROUND

Atmospheric storage tanks are important storage and transportation devices in the petroleum and chemical fields. Corrosion, as the main cause of failure and destruction of steel storage tanks, is the most difficult for managers to detect due to its concealment, and the harm extent increases as the service time of storage tank increases. In order to prevent instead of dealing with the consequences, it is required to test the storage tank bottom plate regularly.

The testing for corrosion of storage tank bottom plate can be divided into opened tank testing and on-line testing. Opened tank testing is the most commonly used method for regular testing of the storage tank bottom plate, which has the advantages of comprehensive testing, but requires cessation of production, material pouring, clearing, and replacement, and then the entering of people, leading to a long duration of the testing process, heavy workload and high economic cost. On-line testing avoids the shortcomings of opened tank testing. However, current on-line testing technologies, such as acoustic emission and storage tank bottom plate testing robot techniques, also have some problems.

Acoustic emission technology relies upon a certain number of sensors, which are installed in a circumferential direction of the outer wall plate of the storage tank at a certain distance from the bottom plate to detect the acoustic emission signal generated by the storage tank bottom plate due to corrosion, to determine the severity of the corrosion of the storage tank bottom plate according to characteristic parameters of the acoustic emission signal and to determine the position of the corrosion region. However, due to the limited propagation distance of the acoustic emission signal caused by the corrosion of the storage tank bottom plate, with the large-scale development of storage tanks, the acoustic emission testing range may not cover the whole bottom plate, which makes this technology face the problem of missing testing.

Existing storage tank bottom plate testing robot technology is equipped with ultrasonic, magnetic flux leakage, pulsed eddy current and other sensors configured to measure the wall thickness or metal margin of the storage tank bottom plate in the traveling process of the robot, and then to quantitatively determine the corrosion degree of the storage tank bottom plate. However, these methods can be only used to find out the regions where corrosion has occurred, and cannot be used to determine whether the corrosion is still occurring and whether the corrosion is severe.

SUMMARY

An objective of the present disclosure is to provide an acoustic emission internal testing method and device for corrosion of a large liquid-carrying storage tank bottom plate. By installing an acoustic emission sensor and an underwater acoustic transducer on a storage tank robot, the comprehensive testing and evaluation on the real-time corrosion state of the storage tank bottom plate are achieved.

In order to achieve the above object, the present disclosure provides the following solution:

An acoustic emission internal testing method for corrosion of a large liquid-carrying storage tank bottom plate includes the following steps:

installing at least two acoustic emission sensors and one underwater acoustic transducer at the bottom of a storage tank robot in a traveling direction of the storage tank robot, where the underwater acoustic transducer is closely adjacent to one of the acoustic emission sensors;

moving the underwater acoustic transducer to the bottom plate after the storage tank robot is placed into a tank, collecting, by the acoustic emission sensors, an acoustic emission signal generated by the underwater acoustic transducer, and calculating an attenuation coefficient of the acoustic emission signal when propagated by the underwater acoustic transducer through a medium according to the acoustic emission signal and relative positions of the underwater acoustic transducer and the acoustic emission sensors;

determining a step distance of the storage tank robot according to the attenuation coefficient and amplitude of a corrosion acoustic emission signal;

collecting, by all acoustic emission sensors, an acoustic emission signal generated by the storage tank bottom plate after the storage tank robot travels every step distance on the storage tank bottom plate; and determining the position where the storage tank bottom plate is corroded and the corrosion degree according to intensity characteristic parameters and activity characteristic parameters of the acoustic emission signal collected after the storage tank robot travels every step distance.

Alternatively, the steps of moving the underwater acoustic transducer to the bottom plate after the storage tank robot is placed into a tank, collecting, by the acoustic emission sensor, an acoustic emission signal generated by the underwater acoustic transducer, and calculating an attenuation coefficient of the acoustic emission signal when propagated by the underwater acoustic transducer through a medium according to the acoustic emission signal and relative positions of the underwater acoustic transducer and the acoustic emission sensor specifically include the following steps:

moving the underwater acoustic transducer installed on the storage tank robot to the storage tank bottom plate using a telescopic rod, and generating an acoustic emission signal under the excitation of a pulse voltage;

receiving an acoustic emission signal generated by the underwater acoustic transducer through the i-th acoustic emission sensor and the j-th acoustic emission sensor which is closely adjacent to the underwater acoustic transducer;

according to the acoustic emission signal received by the i-th acoustic emission sensor and the j-th acoustic emission sensor, and relative positions of the underwater acoustic transducer and the i-th acoustic emission sensor, calculating an attenuation coefficient $\beta_i$ corresponding to the i-th acoustic emission sensor by using a formula $$\beta_i = \frac{a_i - b_j}{\sqrt{x_{ij}^2 + y_i^2} - y_i},$$

where $\alpha_i$ is the amplitude of the acoustic emission signal received by the i-th acoustic emission sensor, $b_j$ is the amplitude of the acoustic emission signal received by the j-th acoustic emission sensor, $x_{ij}$ is a distance between the i-th acoustic emission sensor and the j-th acoustic emission sensor, and $y_i$ is a vertical distance from the i-th acoustic emission sensor to the underwater acoustic transducer; and taking an average value of the attenuation coefficients corresponding to all acoustic emission sensors as the attenuation coefficient of the acoustic emission signal when propagated by the storage tank bottom plate through a medium.

Alternatively, the step of determining a step distance of the storage tank robot according to the attenuation coefficient and amplitude of a corrosion acoustic emission signal specifically includes the following steps:

according to the attenuation coefficient and the amplitude of the corrosion acoustic emission signal, determining a measurement range F of the acoustic emission sensor by using a formula $$F = \frac{m_1 - m_{th}}{\beta},$$

where $\beta$ is the attenuation coefficient of the acoustic emission signal when propagated by the storage tank bottom plate through a medium, $m_1$ is the amplitude of the corrosion acoustic emission signal, and $m_{th}$ is a threshold value; and selecting a value smaller than the measurement range as a step distance.

Alternatively, after the step of determining a step distance of the storage tank robot according to the attenuation coefficient and amplitude of a corrosion acoustic emission signal, the method further includes the following steps:

marking a testing region after the storage tank robot travels every step distance according to a traveling route and the step distance of the storage tank robot.

Alternatively, the step of determining the position where the storage tank bottom plate is corroded and the corrosion degree according to intensity characteristic parameters and activity characteristic parameters of the acoustic emission signal collected after the storage tank robot travels every step distance specifically includes the following steps:

acquiring activity characteristic parameters in the process of corrosion degree of the same material as the storage tank bottom plate in the laboratory to form a corresponding table of the activity characteristic parameters and corrosion degree level;

determining the position of a corrosion region of the storage tank bottom plate according to intensity characteristic parameters of the collected acoustic emission signal; and according to the activity characteristic parameters of the collected acoustic emission signal, determining the corrosion degree level of the corrosion region of the storage tank bottom plate by searching the corresponding table of the activity characteristic parameters and the corrosion degree level.

Alternatively, the intensity characteristic parameters include the amplitude, energy, and a root-mean-square voltage value of the acoustic emission signal.

The activity characteristic parameters include hit number and ring-down count of the acoustic emission signal.

An acoustic emission internal testing device for corrosion of a large liquid-carrying storage tank bottom plate includes a storage tank robot, an acoustic emission acquisition card, an upper computer, an underwater acoustic transducer, and at least two acoustic emission sensors.

The at least two acoustic emission sensors are sequentially installed at the bottom of the storage tank robot in a traveling direction of the storage tank robot. The acoustic emission acquisition card is arranged inside the storage tank robot or outside a storage tank. The underwater acoustic transducer is installed on the storage tank robot, and the underwater acoustic transducer is closely adjacent to one of the acoustic emission sensors.

The underwater acoustic transducer is configured to generate an acoustic emission signal under the excitation of a pulse voltage after the storage tank robot is placed into the tank.

The at least two acoustic emission sensors are configured to collect the acoustic emission signal, and to convert the acoustic emission signal into an acoustic emission electrical signal at the same time.

The signal input end of the acoustic emission acquisition card is connected to the at least two acoustic emission sensors, and the signal output end of the acoustic emission acquisition card is connected to the upper computer. The acoustic emission acquisition card is used for acquiring the acoustic emission electrical signal and transmitting the acoustic emission electrical signal to the upper computer.

The upper computer is configured to determine a step distance of the storage tank robot, the position where a storage tank bottom plate is corroded and the corrosion degree according to the acoustic emission electrical signal.

Alternatively, the at least two acoustic emission sensors are installed at the bottom of the storage tank robot, and the at least two acoustic emission sensors are uniformly distributed in the traveling direction of the storage tank robot.

The underwater acoustic transducer is installed at the bottom of the storage tank robot using a telescopic rod, and the underwater acoustic transducer is closely adjacent to one of the acoustic emission sensors.

According to the specific embodiment provided by the present disclosure, the present disclosure discloses the following technical effects:

In accordance with an acoustic emission internal testing method and device for corrosion of a large liquid-carrying storage tank bottom plate, an acoustic emission sensor and an underwater acoustic transducer are installed on a storage tank robot. At first, the acoustic emission sensor is configured to collect an acoustic emission signal generated by the underwater acoustic transducer, and to calculate an attenuation coefficient of the acoustic emission signal when propagated by the underwater acoustic transducer through a medium, thereby determining a step distance of the storage tank robot. Then, after the storage tank robot travels every step distance on the storage tank bottom plate, the acoustic emission sensor is configured to collect an acoustic emission signal generated by the storage tank bottom plate. Finally, according to intensity characteristic parameters and activity characteristic parameters of the acoustic emission signal collected after the storage tank robot travels every step distance, the position where the storage tank bottom plate is corroded and corrosion degree are determined. By installing the acoustic emission sensor on the robot, the advantages of acoustic emission technology and storage tank robot technology are integrated, and the comprehensive testing and evaluation of the real-time corrosion state of the storage tank bottom plate are achieved.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

FIG. 1 is a flow chart of an acoustic emission internal testing method for corrosion of a large liquid-carrying storage tank bottom plate according to an embodiment of the present disclosure.

DETAILED DESCRIPTION OF THE EMBODIMENTS

Figure 2:
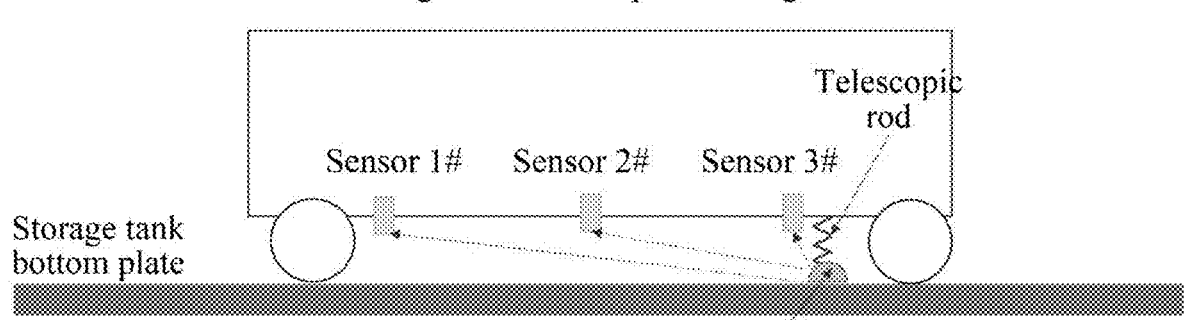
FIG. 2 is a schematic diagram of the installation of an acoustic emission sensor according to an embodiment of the present disclosure.

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide an acoustic emission internal testing method and device for corrosion of a large liquid-carrying storage tank bottom plate. By installing an acoustic emission sensor and an underwater acoustic transducer on a storage tank robot, the comprehensive testing and evaluation on the real-time corrosion state of the storage tank bottom plate are achieved.

To make the above objectives, features and advantages of the present disclosure more apparently and understandably, the present disclosure is further described in detail below with reference to the accompanying drawings and specific embodiments.

For the shortcomings of acoustic emission technology and storage tank bottom plate testing robot technology, acoustic emission technology and robot technology are integrated in the present disclosure, and thus an acoustic emission internal testing method for corrosion of a large liquid-carrying storage tank bottom plate is provided. By installing an acoustic emission sensor on the storage tank bottom plate testing robot, the comprehensive testing and evaluation of the real-time corrosion state of the storage tank bottom plate are achieved.

An acoustic emission internal testing method for corrosion of a large liquid-carrying storage tank bottom plate according to an embodiment of the present disclosure, as shown in FIG. 1, includes the following steps:

Step 1: At least two acoustic emission sensors and one underwater acoustic transducer are installed at the bottom of a storage tank robot in a traveling direction of the storage tank robot.

The at least two acoustic emission sensors and one underwater acoustic transducer are installed at the bottom of a storage tank bottom plate testing robot (storage tank robot). The acoustic emission sensors are uniformly distributed in a movement direction of the storage tank bottom plate testing robot, with a detection surface facing a storage tank bottom plate. The underwater acoustic transducer is closely adjacent to one of the acoustic emission sensors, as shown in FIG. 2.

Step 2: After the storage tank robot is placed into a tank, the acoustic emission sensors are configured to collect an acoustic emission signal generated by the underwater acoustic transducer, and to calculate an attenuation coefficient of the acoustic emission signal when propagated by the underwater acoustic transducer through a medium according to the acoustic emission signal and relative positions of the underwater acoustic transducer and the acoustic emission sensor.

After the storage tank bottom plate testing robot is placed into the storage tank bottom plate, the liquid level in the storage tank is at least higher than a detection surface of the sensor. A pulse voltage with the same amplitude and energy is applied to the underwater acoustic transducer to make the underwater acoustic transducer excite an acoustic signal. As the underwater acoustic transducer can generate a uniform acoustic emission signal in the hemisphere, the acoustic emission signal generated by the transducer can be received by each sensor. The attenuation coefficient $\beta$ of the acoustic emission signal in the storage tank medium can be calculated according to the amplitude of the acoustic emission signal collected by each sensor and the relative distance between the sensor and the underwater acoustic transducer. The attenuation coefficient calculated according to such a method can avoid the influence of media types, uneven media and stratification in the storage tank on the attenuation coefficient.

A specific calculation method of the attenuation coefficient is as follows:

The underwater acoustic transducer installed on the storage tank robot is moved to the storage tank bottom plate using a telescopic rod, and then is configured to generated an acoustic emission signal under the excitation of a pulse voltage.

The i-th acoustic emission sensor and the j-th acoustic emission sensor which is closely adjacent to the underwater acoustic transducer are configured to receive the acoustic emission signal generated by the underwater acoustic transducer.

According to the acoustic emission signal received by the i-th acoustic emission sensor and the j-th acoustic emission sensor, and relative positions of the underwater acoustic transducer and the i-th acoustic emission sensor, an attenuation coefficient $\beta_i$ corresponding to the i-th acoustic emission sensor is calculated by using a formula $$\beta_i = \frac{a_i - b_j}{\sqrt{x_{ij}^2 + y_i^2} - y_i},$$

where, $a_i$ is the amplitude of the acoustic emission signal received by the i-th acoustic emission sensor, $b_j$ is the amplitude of the acoustic emission signal received by the j-th acoustic emission sensor, $x_{ij}$ is a distance between the i-th acoustic emission sensor and the j-th acoustic emission sensor, and $y_i$ is a vertical distance from the i-th acoustic emission sensor to the underwater acoustic transducer.

An average value of the attenuation coefficients corresponding to all acoustic emission sensors is used as the attenuation coefficient $\beta$ of the acoustic emission signal when propagated by the storage tank bottom plate through a medium.

Step 3: A step distance of the storage tank robot is determined according to the attenuation coefficient and amplitude of a corrosion acoustic emission signal.

The measurement range of the acoustic emission sensor is determined according to the attenuation coefficient of the acoustic emission signal when propagated by the storage tank bottom plate through the medium and the amplitude of the corrosion acoustic emission signal of the storage tank bottom plate. Due to the collection of the acoustic emission signal, the storage tank bottom plate testing robot is in a stop state, and the step distance of the storage tank bottom plate testing robot is determined according to the measurement range.

The amplitude of the acoustic emission signal caused by corrosion is generally not more than 75 dB. Assuming that the amplitude of the corrosion acoustic emission signal is $m_1$ dB, the attenuation coefficient is B, the threshold value is $m_{th}$ dB, then the measurement range is $(m_1-m_{th})/\beta$, as long as the step distance is less than the measurement range.

According to a traveling route and the step distance of the robot, various testing regions are marked. Taking the traveling route of the robot as a coordinate system, the position of the robot when stopping moving for testing is named according to certain rules, and the name is used as a mark. For example, the starting position of the robot serves as an origin, which is named "1-0" point. After the testing is carried out at this position, the robot steps Tm, and then stops moving to start testing at a new position. The now position is named "1-1" point, and so on, the position after the robot moves nT m is named "1-n" point. During acoustic emission testing, when the robot is located at "0" point, the acoustic emission data is named "0" point, and when the robot is located at "1-n" point, the acoustic emission data is named "1-n". The naming of the acoustic emission signal data is consistent with, or in one-to-one correspondence with, the name of the mark, and thus the collected corrosion acoustic emission signal data is enabled to correspond to the collection position.

Step 4: After the storage tank robot travels every step distance on the storage tank bottom plate, all acoustic emission sensors are configured to collect an acoustic emission signal generated by the storage tank bottom plate.

Step 5: The position where the storage tank bottom plate is corroded and the corrosion degree are determined according to intensity characteristic parameters and activity characteristic parameters of the acoustic emission signal collected after the storage tank robot travels every step distance.

Due to the fact that the closer the sensor to the corrosion region, the greater the intensity parameters such as amplitude, energy and root-mean-square voltage value of the acoustic emission signal collected, and the larger the corrosion area of the storage tank bottom plate, the faster the corrosion rate, the greater the activity parameters such as hit number and ring-down count of the acoustic emission signal collected by the acoustic emission sensor. After the storage tank bottom plate testing robot finishes the testing according to a planned route, the position of the corrosion region can be determined by comparing and analyzing the intensity characteristic parameters, such as amplitude, energy and root-mean-square voltage value, of the acoustic emission signals in various testing regions. The corrosion degree of each testing region of the storage tank bottom plate can be classified according to the activity characteristic parameters such as the hit number and ring-down count.

The energy and root-mean-square voltage can be calculated according to the waveform of the acoustic emission signal.

Prior to the storage tank bottom plate testing, characteristic values of the activity parameters such as acoustic emission hit number and ring-down count in the process of corrosion degree of the same material as the storage tank bottom plate are obtained in the laboratory, thus forming a corresponding table of the activity characteristic parameters and corrosion degree level. The actual testing is classified according to the corresponding table of the activity characteristic parameters and corrosion degree level.

The acoustic emission internal testing method for corrosion of a large liquid-carrying storage tank bottom plate according to the present disclosure integrates the advantages of acoustic emission technology and storage tank bottom plate testing robot technology, which not only solves the problem of limited testing range of the existing acoustic emission technology, but also makes up for the problem that the existing storage tank bottom plate testing robot cannot determine a corrosion state of the storage tank bottom plate in real time. In accordance with the present disclosure, omni-directional scanning of the storage tank bottom plate can be achieved, and the corrosion-occurring portion of the storage tank bottom plate can be tested and evaluated.

It is also provided an acoustic emission internal testing device for corrosion of a large liquid-carrying storage tank bottom plate. The device includes a storage tank robot, an acoustic emission acquisition card, an upper computer, an underwater acoustic transducer, and at least two acoustic emission sensors.

The at least two acoustic emission sensors are sequentially installed at the bottom of the storage tank robot in a traveling direction of the storage tank robot. The acoustic emission acquisition card is arranged inside the storage tank robot or outside a storage tank.

The underwater acoustic transducer is installed on the storage tank robot, and the underwater acoustic transducer is closely adjacent to one of the acoustic emission sensors.

The underwater acoustic transducer is configured to generate an acoustic emission signal under the excitation of a pulse voltage after the storage tank robot is placed into the tank. The at least two acoustic emission sensors are configured to collect the acoustic emission signal, and to convert the acoustic emission signal into an acoustic emission electrical signal at the same time.

The signal input end of the acoustic emission acquisition card is connected to the at least two acoustic emission sensors, and the signal output end of the acoustic emission acquisition card is connected to the upper computer. The acoustic emission acquisition card is used for acquiring the acoustic emission electrical signal and transmitting the acoustic emission electrical signal to the upper computer.

The upper computer is configured to determine a step distance of the storage tank robot, the position where a storage tank bottom plate is corroded and the corrosion degree according to the acoustic emission electrical signal.

The method used by the upper computer for determining the step distance of the storage tank robot and determining the position where the storage tank bottom plate is corroded and the corrosion degree according to the acoustic emission electrical signal can be referred to the acoustic emission internal testing method for corrosion of a large liquid-carrying storage tank bottom plate, and will not be described in detail here.

Illustratively, the at least two acoustic emission sensors are installed at the bottom of the storage tank robot, and the at least two acoustic emission sensors are uniformly distributed in the traveling direction of the storage tank robot. The underwater acoustic transducer is installed at the bottom of the storage tank robot by a telescopic rod, and the underwater acoustic transducer is closely adjacent to one of the acoustic emission sensors. The acoustic emission sensors and the acoustic emission acquisition card are connected by cables.

Embodiments in this specification are described in a progressive manner, each embodiment focuses on differences from other embodiments, and the same and similar parts between the embodiments can be referred to each other. Since the system disclosed in the embodiments correspond to the method disclosed by the embodiments, the description thereof is relatively simple, and for relevant matters references may be made to the description of the method. Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An acoustic emission internal testing method for detecting corrosion of a large liquid-carrying storage tank bottom plate, comprising the steps of:

installing at least two acoustic emission sensors and one underwater acoustic transducer at a bottom of a storage tank robot in a traveling direction of the storage tank robot, wherein the underwater acoustic transducer is closely adjacent to one of the acoustic emission sensors;

moving the underwater acoustic transducer to the storage tank bottom plate after the storage tank robot is placed into a tank; collecting, by the acoustic emission sensors, an acoustic emission signal generated by the underwater acoustic transducer, and calculating an attenuation coefficient of the acoustic emission signal when propagated by the underwater acoustic transducer through a medium according to the acoustic emission signal and relative positions of the underwater acoustic transducer and the acoustic emission sensors;

determining a step distance of the storage tank robot according to the attenuation coefficient and an amplitude of a corrosion acoustic emission signal;

collecting, by all of the acoustic emission sensors, an acoustic emission signal generated by the storage tank bottom plate after the storage tank robot travels every step distance on the storage tank bottom plate; and determining a position where the storage tank bottom plate is corroded and a corrosion degree according to intensity characteristic parameters and activity characteristic parameters of the acoustic emission signal collected after the storage tank robot travels the every step distance.

2. The acoustic emission internal testing method for detecting corrosion of a large liquid-carrying storage tank bottom plate according to claim 1, wherein the steps of moving the underwater acoustic transducer to the bottom plate after the storage tank robot is placed into a tank, collecting, by the acoustic emission sensors, an acoustic emission signal generated by the underwater acoustic transducer, and calculating an attenuation coefficient of the acoustic emission signal when propagated by the underwater acoustic transducer through a medium according to the acoustic emission signal and relative positions of the underwater acoustic transducer and the acoustic emission sensors comprise:

moving the underwater acoustic transducer installed on the storage tank robot to the storage tank bottom plate using a telescopic rod, and generating an acoustic emission signal under an excitation of a pulse voltage;

receiving an acoustic emission signal generated by the underwater acoustic transducer through an i-th acoustic emission sensor and a j-th acoustic emission sensor which is closely adjacent to the underwater acoustic transducer, in which i and j are positive integers;

according to the acoustic emission signal received by the i-th acoustic emission sensor and the j-th acoustic emission sensor, and relative positions of the underwater acoustic transducer and the i-th acoustic emission sensor, calculating an attenuation coefficient $\beta_i$ corresponding to the i-th acoustic emission sensor by using a formula $$\beta_i = \frac{a_i - b_j}{\sqrt{x_{ij}^2 + y_i^2} - y_i},$$

wherein $a_i$ is the amplitude of the acoustic emission signal received by the i-th acoustic emission sensor, $b_j$ is the amplitude of the acoustic emission signal received by the j-th acoustic emission sensor, $x_{ij}$ is a distance between the i-th acoustic emission sensor and the j-th acoustic emission sensor, and $y_i$ is a vertical distance from the i-th acoustic emission sensor to the underwater acoustic transducer; and taking an average value of the attenuation coefficients corresponding to all of the acoustic emission sensors as the attenuation coefficient of the acoustic emission signal when propagated by the storage tank bottom plate through a medium.

3. The acoustic emission internal testing method for detecting corrosion of a large liquid-carrying storage tank bottom plate according to claim 1, wherein the step of determining a step distance of the storage tank robot according to the attenuation coefficient and the amplitude of a corrosion acoustic emission signal comprises:

according to the attenuation coefficient and the amplitude of the corrosion acoustic emission signal, determining a measurement range F of the acoustic emission sensors by using a formula $$F = \frac{m_1 - m_{th}}{\beta},$$

wherein $\beta$ is the attenuation coefficient of the acoustic emission signal when propagated by the storage tank bottom plate through a medium, $m_1$ is the amplitude of the corrosion acoustic emission signal, and $m_{th}$ is a threshold value; and selecting a value smaller than the measurement range as the step distance.

4. The acoustic emission internal testing method for detecting corrosion of a large liquid-carrying storage tank bottom plate according to claim 1, wherein after the step of determining a step distance of the storage tank robot according to the attenuation coefficient and the amplitude of the corrosion acoustic emission signal, the method further comprises:

marking a testing region after the storage tank robot travels the every step distance according to a traveling route and the step distance of the storage tank robot.

5. The acoustic emission internal testing method for detecting corrosion of a large liquid-carrying storage tank bottom plate according to claim 1, wherein the step of determining the position where the storage tank bottom plate is corroded and the corrosion degree according to intensity characteristic parameters and activity characteristic parameters of the acoustic emission signal collected after the storage tank robot travels the every step distance comprises:

acquiring the activity characteristic parameters in the process of the corrosion degree of the same material as the storage tank bottom plate in the laboratory to form a corresponding table of the activity characteristic parameters and a corrosion degree level;

determining the position of a corrosion region of the storage tank bottom plate according to the intensity characteristic parameters of the collected acoustic emission signal; and according to the activity characteristic parameters of the collected acoustic emission signal, determining the corrosion degree level of the corrosion region of the storage tank bottom plate by searching the corresponding table of the activity characteristic parameters and the corrosion degree level.

6. The acoustic emission internal testing method for detecting corrosion of a large liquid-carrying storage tank bottom plate according to claim 1, wherein the intensity characteristic parameters comprise the amplitude, energy, and a root-mean-square voltage value of the acoustic emission signal; and the activity characteristic parameters comprise hit number and ring-down count of the acoustic emission signal.

7. An acoustic emission internal testing device for detecting corrosion of a large liquid-carrying storage tank bottom plate, comprising a storage tank robot, an acoustic emission acquisition card, an upper computer, an underwater acoustic transducer, and at least two acoustic emission sensors;

the at least two acoustic emission sensors are sequentially installed at a bottom of the storage tank robot in a traveling direction of the storage tank robot; the acoustic emission acquisition card is arranged inside the storage tank robot or outside a storage tank; the underwater acoustic transducer is installed on the storage tank robot, and the underwater acoustic transducer is adjacent to one of the acoustic emission sensors;

the underwater acoustic transducer is configured to generate an acoustic emission signal under an excitation of a pulse voltage after the storage tank robot is placed into the storage tank;

the at least two acoustic emission sensors are configured to collect the acoustic emission signal, and to convert the acoustic emission signal into an acoustic emission electrical signal at the same time;

a signal input end of the acoustic emission acquisition card is connected to the at least two acoustic emission sensors, and a signal output end of the acoustic emission acquisition card is connected to the upper computer; the acoustic emission acquisition card is used for acquiring the acoustic emission electrical signal and transmitting the acoustic emission electrical signal to the upper computer; and the upper computer is configured to determine a step distance of the storage tank robot, a position where a storage tank bottom plate is corroded and a corrosion degree according to the acoustic emission electrical signal.

8. The acoustic emission internal testing device for detecting corrosion of a large liquid-carrying storage tank bottom plate according to claim 7, wherein the at least two acoustic emission sensors are installed at the bottom of the storage tank robot, and the at least two acoustic emission sensors are uniformly distributed in the traveling direction of the storage tank robot; and in which the underwater acoustic transducer is installed at the bottom of the storage tank robot by a telescopic rod, and the underwater acoustic transducer is closely adjacent to one of the acoustic emission sensors.

* * * * *